US010289578B2

(12) United States Patent
Bialas, Jr. et al.

(10) Patent No.: US 10,289,578 B2
(45) Date of Patent: May 14, 2019

(54) PER-DRAM AND PER-BUFFER ADDRESSABILITY SHADOW REGISTERS AND WRITE-BACK FUNCTIONALITY

(71) Applicant: International Business Machines Corporation, Armonk, NY (US)

(72) Inventors: John S. Bialas, Jr., South Burlington, VT (US); Stephen P. Glancy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/842,175

(22) Filed: Sep. 1, 2015

(65) Prior Publication Data

US 2017/0060790 A1    Mar. 2, 2017

(51) Int. Cl.
    *G06F 13/00*    (2006.01)
    *G06F 13/16*    (2006.01)

(52) U.S. Cl.
    CPC ............................. *G06F 13/1673* (2013.01)

(58) Field of Classification Search
    CPC .................................................. G06F 13/1673
    See application file for complete search history.

(56) References Cited

U.S. PATENT DOCUMENTS

| | | | | |
|---|---|---|---|---|
| 6,502,168 B1 * | 12/2002 | Arimilli | ................. | G06F 11/349 711/119 |
| 7,864,604 B2 | 1/2011 | David | | |
| 2003/0142111 A1 * | 7/2003 | Emerson | ................ | G06F 3/1454 345/600 |
| 2009/0044044 A1 * | 2/2009 | Harter | .................. | G06F 11/1407 714/6.23 |
| 2013/0346684 A1 | 12/2013 | Bains | | |

(Continued)

FOREIGN PATENT DOCUMENTS

| | | |
|---|---|---|
| CN | 101894584 A | 11/2010 |
| CN | 104240752 A | 12/2014 |
| WO | 2015003553 A1 | 1/2015 |

OTHER PUBLICATIONS

"Synchronous Memory Device Having Variable Bus Width and Burst Length", IP.com, IP.com No. 000215852, Disclosed Anonymously, Mar. 13, 2012, 12 pp.

(Continued)

*Primary Examiner* — Zachary K Huson
(74) *Attorney, Agent, or Firm* — Patterson + Sheridan, LLP

(57) ABSTRACT

In an example, a method includes monitoring a memory bus for one or more commands sent by a memory controller to a memory device and determining whether the one or more commands have a value indicating an operation mode of the memory device. Information associated with the one or more commands may be assessed based on the operation mode, and the information may be stored to one or more registers of the memory controller. The operation mode may be a per dynamic random access memory (DRAM) addressability (PDA) mode, a per buffer addressability (PBA) mode, or a per rank mode. Accessing the information may include a first set of configuration values in response to the value indicating the PDA mode or the PBA mode, and a second set of configuration values in response to the value indicating the per rank mode.

20 Claims, 6 Drawing Sheets

(56) References Cited

U.S. PATENT DOCUMENTS

2014/0244922 A1\* 8/2014 Bains .................. G11C 7/1072
 711/105
2015/0016202 A1 1/2015 Jeon

OTHER PUBLICATIONS

Jeong, et al., "Balancing DRAM Locality and Parallelism in Shared Memory CMP Systems", 2012 IEEE 18th International Symposium on High Performance Computer Architecture (HPCA), Feb. 2012, pp. 1-12.

\* cited by examiner

PER-DRAM AND PER-BUFFER ADDRESSABILITY SHADOW REGISTERS AND WRITE-BACK FUNCTIONALITY

I. FIELD OF THE DISCLOSURE

The present disclosure relates generally to computing technologies, and more particularly, to data transfer and memory management.

II. BACKGROUND

In Double Data Rate Fourth Generation (DDR4) memory technologies, different settings might be required for different dynamic random-access memories (DRAMs) on a given bus. For example, different signal integrity settings have to be set via per-DRAM addressability (PDA) or per-buffer addressability (PBA). The signal integrity setting may be set to avoid data erroneously flipping or glitches on a bus.

Currently, shadow registers are used to store a mode register set (MRS) command that was written to a DRAM on a per memory rank basis. A memory rank is a set of DRAM microchips connected to the same chip select. For PDA and PBA, per memory rank storage of MRS commands causes only one value to be stored across an entire memory rank. For instance, only a last value sent to a rank (and not the prior 19 values) will be stored. The storage of only one value across an entire rank leads to a loss of information in the shadow registers. For example, the settings used for a DRAM can be indeterminable. The loss of information creates problems for automatic routines that write-back settings into DRAMs. For instance, software based training schemes may be required to assist the routines. The software based training schemes require additional code and processing time.

III. SUMMARY OF THE DISCLOSURE

According to a particular embodiment, a method includes monitoring a memory bus for one or more commands sent by a memory controller to a memory device and determining whether the one or more commands have a value indicating an operation mode of the memory device. Information associated with the one or more commands may be assessed based on the operation mode, and the information may be stored to one or more registers of the memory controller.

According to an embodiment, the commands include one or more mode register set (MRS) commands or buffer control-word write (BCW) commands. The monitoring may include identifying an MRS indicator associated with the one or more commands. The information may include dynamic random access memory (DRAM) configuration values. The DRAM configuration values may include one or more on-die termination (ODT) values, one or more voltage reference (Vref) values, or both.

According to an embodiment, the memory device includes one or more DRAM devices of one or more ranks, one or more buffers, or both. The one or more DRAM devices and the one or more buffers may be associated with a double data rate four (DDR4) memory device. The operation mode may be a per dynamic random access memory (DRAM) addressability (PDA) mode, a per buffer addressability (PBA) mode, or a per rank mode. Accessing the information may includes a first set of configuration values in response to the value indicating the PDA mode or the PBA mode, and a second set of configuration values in response to the value indicating the per rank mode.

According to an embodiment, storing the information may include writing a first information set associated with a first MRS command to a first register of the one or more registers; and while the first information set is stored at the first register, writing a second information set associated with a second MRS command to a second register of the one or more registers. The first register may be associated with a DRAM device of a plurality of DRAM devices of the memory device and the second register is associated with a second DRAM device of the plurality of DRAM devices of the memory device.

According to an embodiment, the method may include receiving a write-back command associated with the one or more commands, and in response to the write-back command determining whether the one or more registers have a second value indicating the operation mode associated with the one or more commands. The information associated with the one or more commands may be retrieved from the one or more registers based on the operation mode, and the information may be written to the memory device. If the operation mode is a first mode or a second mode, the method may include sending, to the memory device, an enable command to enable the first mode or the second mode of the memory device prior to writing the information, and sending, to the memory device, a disable command to disable the first mode or the second mode of the memory device after writing the information. In an example, the first mode is a per DRAM addressability (PDA) mode and the second mode is a per buffer addressability PBA mode.

According to another embodiment, an apparatus includes memory control circuitry, shadow circuitry, and snoop circuitry configured to monitor a memory bus for one or more commands sent by the memory control circuitry to a memory device, determine whether the one or more commands have a value indicating an operation mode of the memory device, access information associated with the one or more commands based on the operation mode, and store the information to one or more registers of the shadow circuitry.

According to an embodiment, the operation mode is a per DRAM addressability PDA mode, a PBA mode, or a per rank mode. Storing the information includes a DRAM rank value if the determined value does not indicate the PDA mode or the PBA mode.

According to an embodiment, an apparatus includes a memory bus, a register, and a controller configured to monitor a memory bus for one or more commands sent to a memory device, to determine whether the one or more commands have a value indicating an operation mode of the memory device, to access information associated with the one or more commands based on the operation mode, and to store the information to the register.

According to an embodiment, the one or more commands include one or more MRS commands. The controller may further be configured to receive a write-back command associated with the one or more commands, to determine whether the one or more registers have a second value indicating the operation mode associated with the one or more commands, to retrieve the information associated with the one or more commands from the register based on the operation mode, and to write the information to the memory device.

Features and other benefits that characterize embodiments are set forth in the claims annexed hereto and forming a further part hereof. However, for a better understanding of the embodiments, and of the advantages and objectives

IV. BRIEF DESCRIPTION OF THE DRAWINGS

V. DETAILED DESCRIPTION

Figure 1:
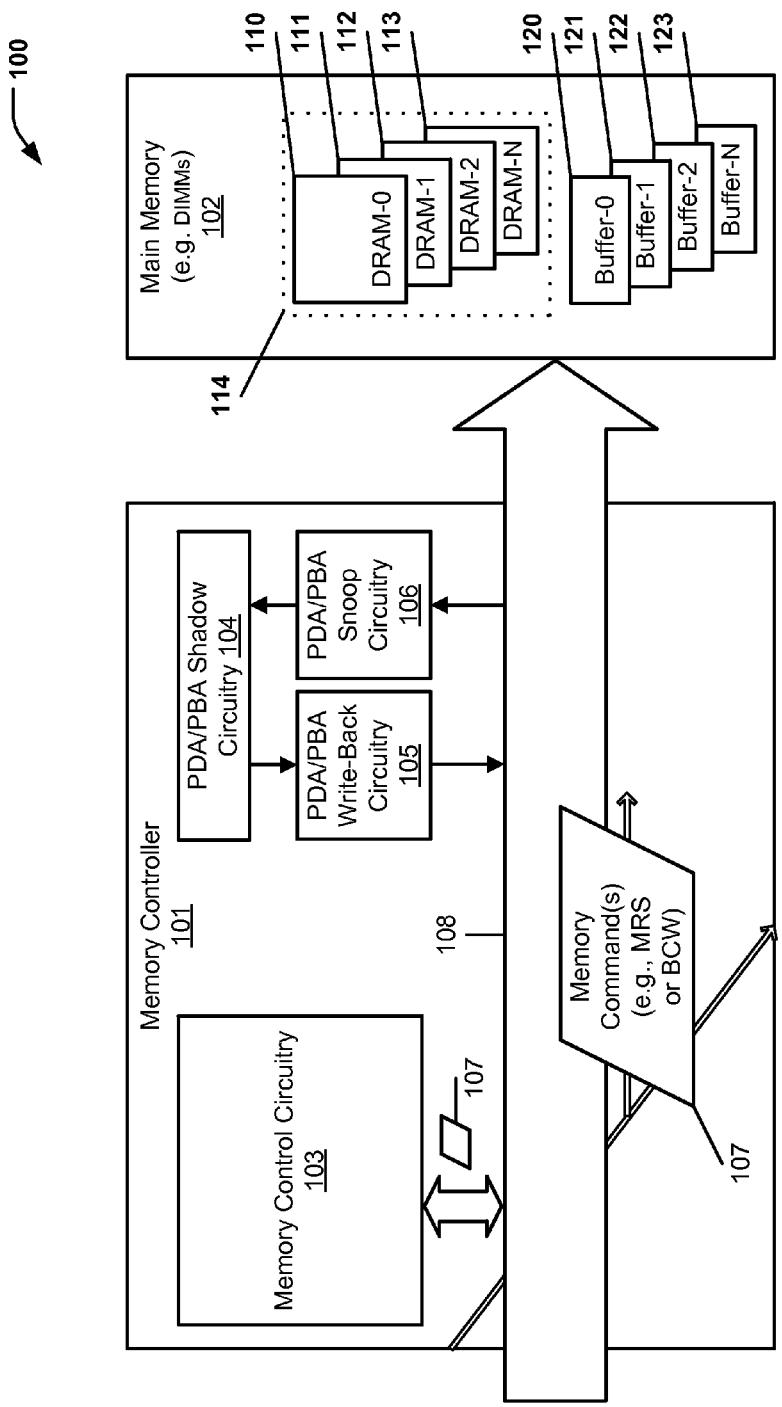
FIG. 1 illustrates a particular embodiment of a system configured to snoop for MRS commands issued for a PDA, PBA, and per-rank basis, to set a PDA or PBA status value.

An embodiment of a system allows a physical interface to snoop for commands issued for a PDA, PBA, and per-rank basis. The commands may be shadowed (e.g., on a PDA, PBA, and per-rank basis). The commands may include MRS or buffer control-word write (BCW) commands. More particularly, PDA uses MRS, and PBA uses BCW commands. Settings associated with the commands may be used to determine operational states and to write-back previously stored values, if requested. Storing values for each DRAM, individually, allows settings to be restored with greater speed and veracity.

Implementations may reduce issues caused where only a single value is stored for an entire rank. Training code may be reduced in an embodiment of the system. Further, a controller is enabled to do periodic calibrations without requiring firmware intervention that would take the system offline. The system of another embodiment uses a software routine to store the settings associated with commands. Such an implementation, however, may take longer to write-back than the hardware implementation described herein.

A first implementation includes PDA or PBA shadow registers for each MRS or BCW command to each DRAM. As such, the first implementation may shadow an entire mode register set command that was sent.

A second implementation includes PDA or PBA shadow registers only for selected settings. In most cases, the selected settings are signal integrity (SI) settings. This implementation is particularly useful when only certain settings are expected to change on a given rank. Other base functions may not be expected to change going across the rank. The system focuses on those settings that might change. The second implementation allows for fewer latches and covers most cases. The second implementation may additionally include protection against non-selected settings functionality change on a PDA or PBA basis. For example, if a base function communication setting is changed accidentally, an error code may be initiated to alert a user.

The system may include a memory controller coupled to and in communication with a plurality of DRAMs via a DRAM command bus. The memory controller may include a snooping module to snoop PDA/PBA. The snooping module may snoop continuously, or may snoop whenever an MRS or BCW command occurs. The snooping module may trap data that is sent out to the DRAM command bus. A shadow module may be configured to store values received from the snooping module. The memory controller may use the stored data to restore values, among other purposes. A write-back module may receive data from the shadow module and write back data to the DRAM command bus. For example, a calibration algorithm may write back data by resending data. The system may write back an MRS or BCW command that is known to be more accurate. The algorithm may be initiated in response to external user input or a hardware generated program.

The snooping function may snoop the command bus for MRS or BCW commands. The snooping function may then store commands to the shadow mechanism. The shadow mechanism may have a status bit to keep track of whether a command is issued with PDA/PBA or not. The status bit may be updated if the MRS or BCW command that the snooping mechanism sees is the MRS or BCW command that contains the PDA or PBA bit.

A status bit may indicate whether a bus is in PDA mode, PBA mode, or in a broadcast mode (e.g., if in neither PDA nor PBA mode). The status bits may be set to show which settings or MRS or BCW commands were set using PDA or PBA, allowing the write-back mechanism to write PDA/PBA on the necessary MRS or BCW commands. It may be helpful during a shadowing operation to track whether a setting was written in PDA or PBA mode, or if the setting was a rank default value. For instance, the system may determine if an MRS or BCW command has been received twice. If an MRS or BCW command is received twice, the PDA or PBA values may not be overridden unless operating in the PDA or PBA mode (e.g., per the status bit). Alternatively, the system could be configured to overwrite the PDA or PBA values based on if a normal MRS or BCW command is sent, as the values in the DRAM would be overwritten. In such cases, it may be desirable to write out a normal MRS or BCW command to set all DRAMs, and then switch one or two DRAMs using PDA. This could be an additional mode bit in the shadowing/write-back system. If an MRS or BCW is alternatively not received, then the system may copy values to be available for later use. That is, if an MRS or BCW is not received, the shadowed values will not be updated for this system.

The determined setting may be used during a write-back function. For example, the system may write everything with a broadcast. If the write-back is requested, the system may write back one standard MRS or BCW and follow it by normal PDA/PBA commands.

An MRS or BCW command that is currently being written using a PDA or PBA may not have been written to an entire rank. In such a case, a rank based MRS or BCW value for the shadow module may receive a default value. The default value may be taken from a last MRS or BCW command. In this manner, the shadow module may have an MRS or BCW value stored for the per rank MRS or BCW value. A write-back operation may occur concurrently with a snooping operation.

FIG. 1 illustrates a particular embodiment of a system 100 configured to snoop for MRS or BCW commands issued for a PDA, PBA, and per-rank basis. In one sense, the system 100 may monitor a memory bus 108 for one or more commands sent by a memory controller 101 to a memory device (e.g., a main memory 102) and determine whether the one or more commands have a value indicating an operation mode of the main memory 102. Information associated with the one or more commands may be assessed based on the operation mode, and the information may be stored to one or more registers of the memory controller 101. The information may include dynamic random access memory (DRAM) configuration values. The DRAM configuration values may include one or more on-die termination (ODT) values, one or more voltage reference (Vref) values, or both.

The memory controller 101 may be configured to send memory commands, such as MRS or BCW commands, to the main memory 102. The main memory 102 of an embodiment may comprise DIMMs. As is shown in FIG. 1, the main memory 102 includes DRAMs 110-113 and buffers 120-123. The memory controller 101 may include memory control circuitry 103 and PDA/PBA shadow circuitry 104. The memory control circuitry 103 may include logic to control the memory bus, as well as data and control/command/clock/address values. The PDA/PBA shadow circuitry 104 may use PDA/PBA snoop circuitry 106 to snoop the memory commands 107 from the command bus 108. The memory commands 107 may be issued from the PDA/PBA write-back circuitry 105 to send write-backs to the memory bus 108.

Figure 2:
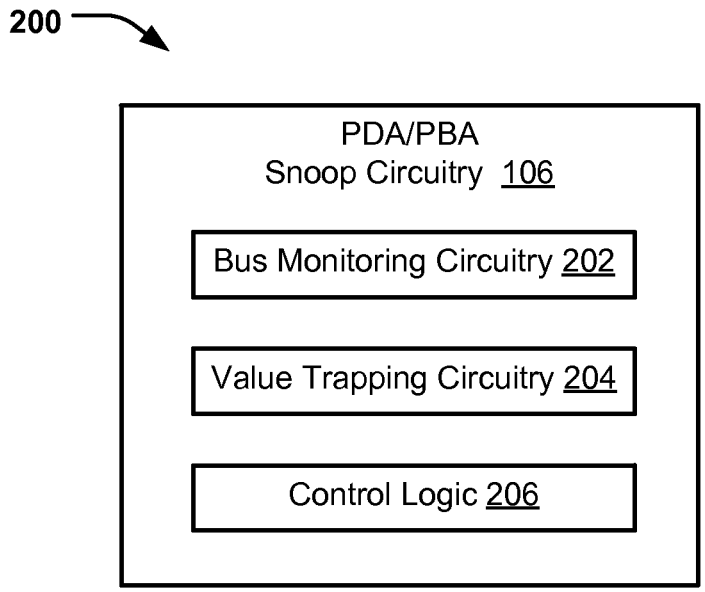
FIG. 2 is a block diagram of a system that shows components of the PDA/PBA snoop circuitry of FIG. 1 in more detail.

FIG. 2 is a block diagram of a system 200 that shows components of PDA/PBA snoop circuitry in more detail. The PDA/PBA snoop circuitry may be the PDA/PBA snoop circuitry 106 of FIG. 1. As shown in FIG. 2, the PDA/PBA snoop circuitry 106 may include bus monitoring circuitry 202, value trapping circuitry 204, and control logic 206. The value trapping circuitry 204 may trap data that is send to a command bus.

Figure 3:
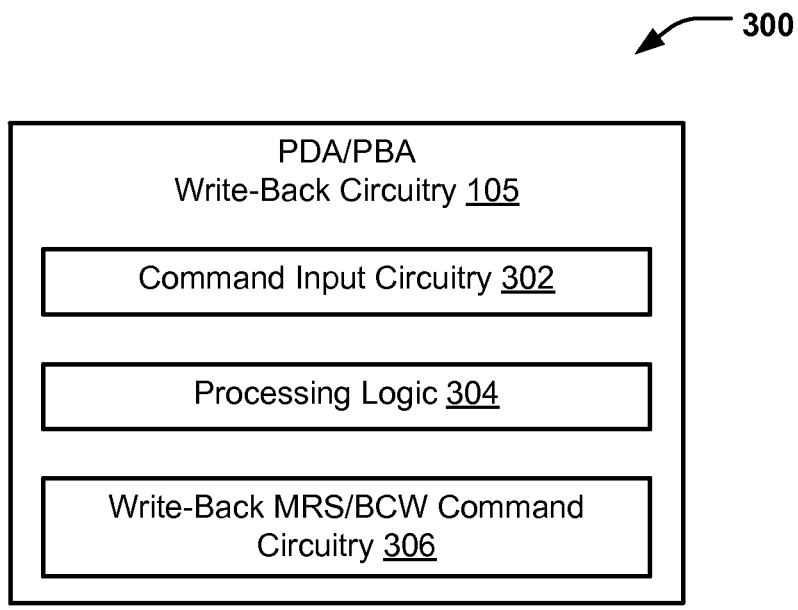
FIG. 3 is a block diagram of a system that shows components of the PDA/PBA write-back circuitry of FIG. 1 in more detail.

FIG. 3 is a block diagram of a system 300 that shows components of PDA/PBA write-back circuitry in more detail. The PDA/PBA write-back circuitry may be the PDA/PBA write-back circuitry 105 of FIG. 1. As shown in FIG. 3, the PDA/PBA write-back circuitry 106 may include command input circuitry 302, processing logic 304, and write-back MRS command circuitry 306. The write-back MRS command circuitry 306 may receive data from the shadow module and write back data to the command bus.

Figure 4:
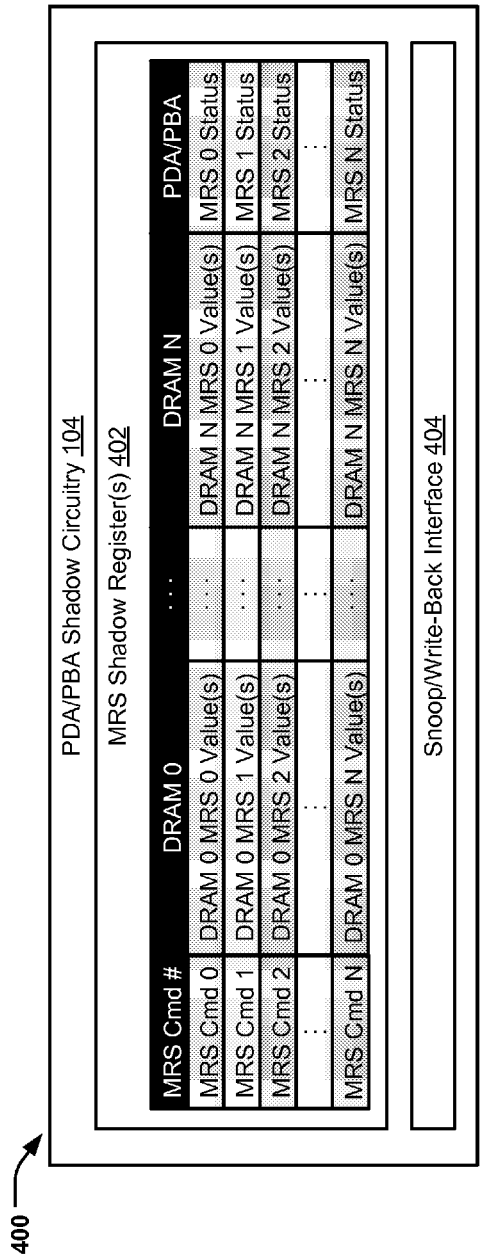
FIG. 4 is a user interface displaying MRS shadow register values stored by PDA/PBA circuitry, such as the PDA/PBA circuitry of FIG. 1.

FIG. 4 is a user interface displaying MRS shadow register values stored by PDA/PBA circuitry, such as the PDA/PBA circuitry 104 of FIG. 1. As shown in FIG. 4, the MRS shadow registers 402 may include tabled information associating MRS command numbers (e.g., MRS command 0 through MRS command N) with corresponding DRAMs (e.g., DRAM 0 through DRAM N), as well as with an MRS status of a corresponding PDA or PBA. The user interface additionally shows a snoop/write-back interface 404.

Figure 5:
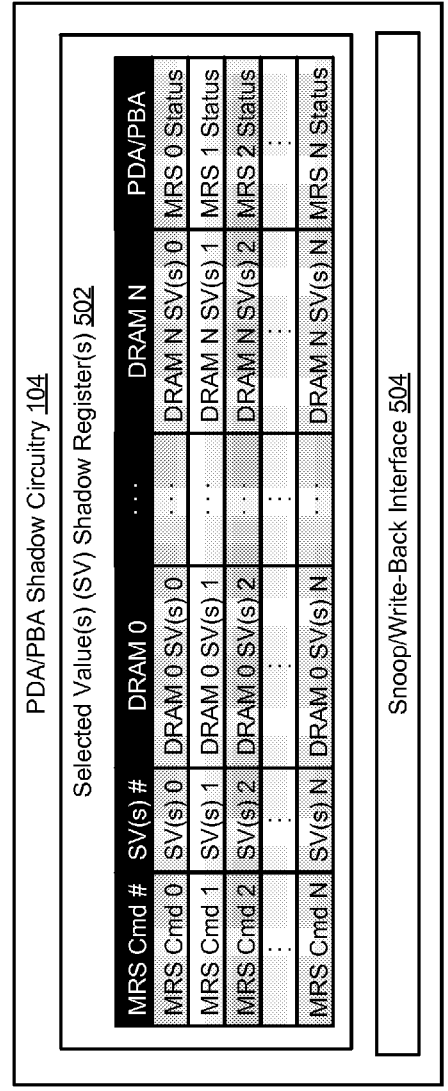
FIG. 5 is a user interface displaying selected values (SV) shadow register values stored by PDA/PBA circuitry, such as the PDA/PBA circuitry of FIG. 1.

FIG. 5 is a user interface displaying selected values (SV) shadow register values stored by PDA/PBA circuitry, such as the PDA/PBA circuitry 104 of FIG. 1. As shown in FIG. 5, the SV shadow register 502 may include tabled information associating MRS command numbers (e.g., MRS command 0 through MRS command N) with corresponding SVs (e.g., SV0 through SVN), DRAMs (e.g., DRAM 0 through DRAM N), as well as with an MRS status of a corresponding PDA or PBA. The user interface additionally shows a snoop/write-back interface 504.

Figure 6:
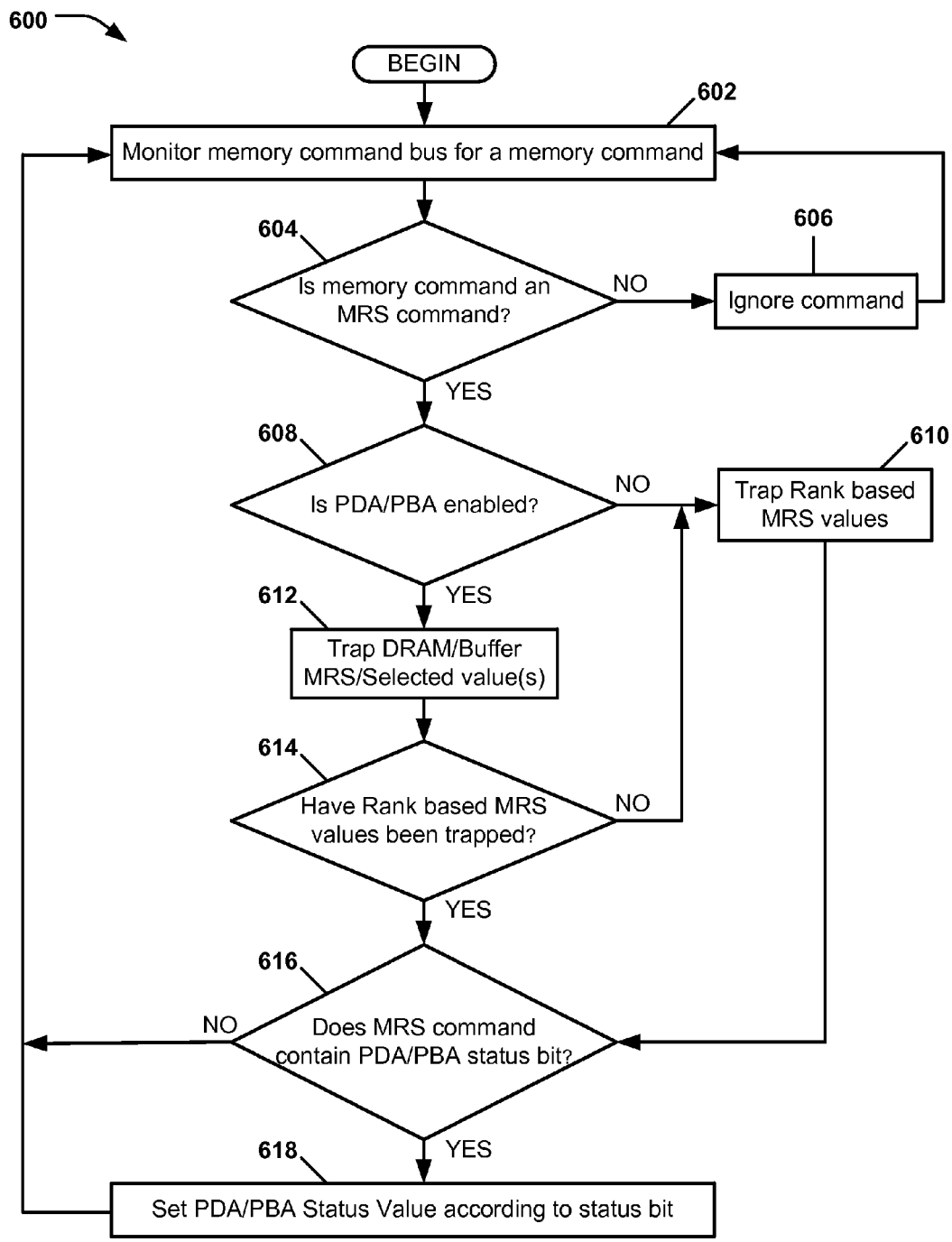
FIG. 6 is a flowchart of an embodiment of a method of monitoring a memory command bus for a memory command to set a PDA or PBA status value.

FIG. 6 is a flowchart of an embodiment of a method 600 of monitoring a memory command bus for a memory command to set a PDA or PBA status value. The method 600 may be performed by a computing system, such as the system 100 of FIG. 1. Turning more particularly to the flowchart, the system may monitor at 602 the memory command bus for a memory command. The system may determine at 604 whether a detected memory command is an MRS command. For purposes of this description, MRS may be substituted with BCW, depending on whether it is a PDA or PBA operation. When the memory command is not an MRS (or BCW) command at 604, the system may ignore the command at 606.

When the memory command identified at 602 is alternatively determined to be an MRS command at 604, the system may determine at 608 whether the PDA or PBA is enabled. When the command is not PDA or PBA enabled at 608, the system may trap rank based MRS values at 610. Alternatively, when the command is determined at 608 to be PDA/PBA enabled, the system at 612 may trap DRAM/buffer MRS/selected values.

The system may determine at 614 whether rank based MRS values have been trapped. When no MRS values have been trapped at 614, the system may trap rank based MRS values at 610.

When rank based MRS values have been trapped at 614, the system may determine at 616 whether the MRS command includes a PDA or PBA status bit. When no, the system may return to 602. Alternatively, the system may set the PDA or PBA status value at 618 according to the PDA/PBA status bit.

Figure 7:
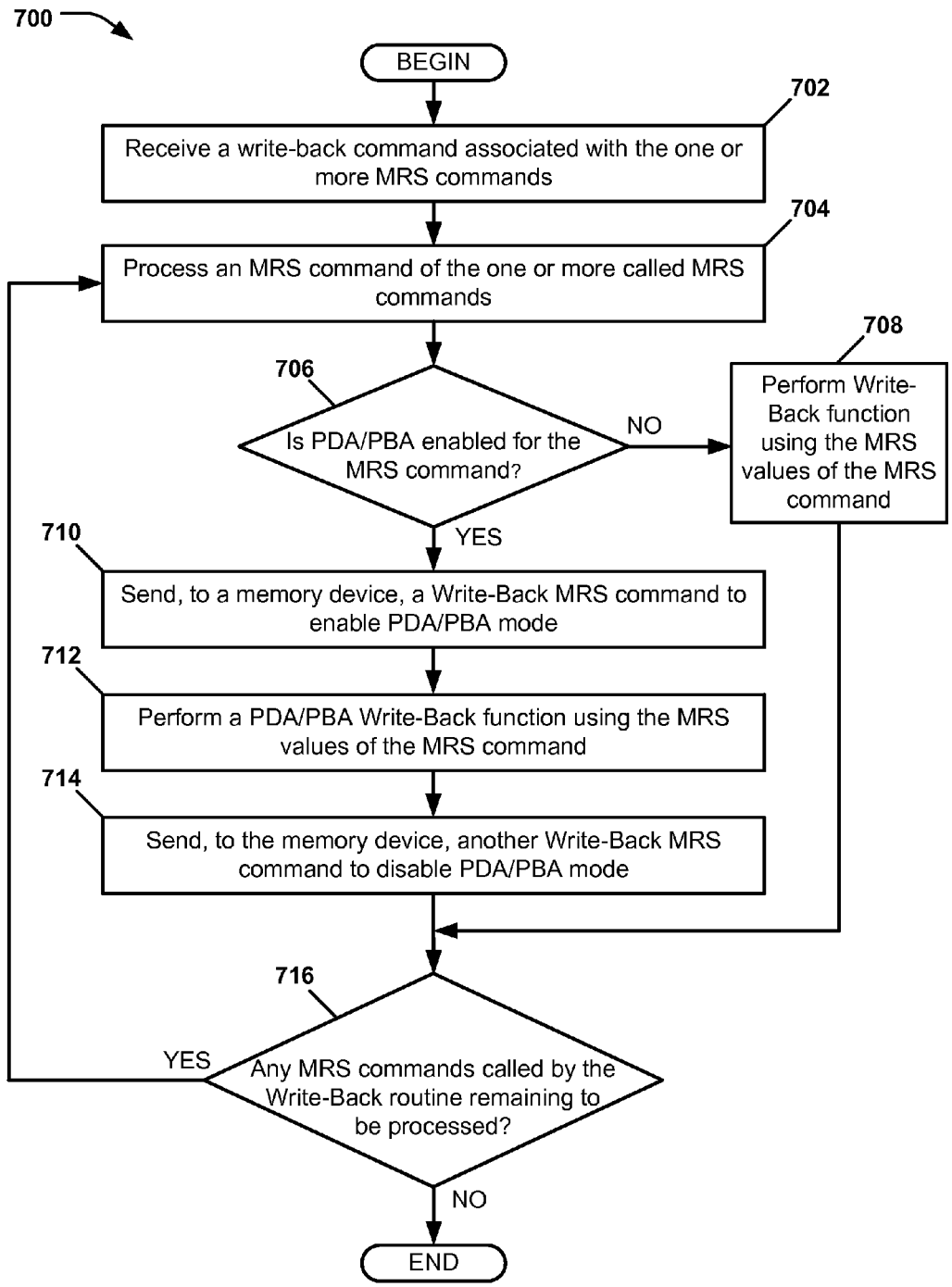
FIG. 7 is a flowchart of an embodiment of a method of executing a write-back mechanism that is consistent with an embodiment.

FIG. 7 is a flowchart of an embodiment of a method 700 of executing a write-back mechanism that is consistent with an embodiment. When the write-back mechanism is called, stored MRS values may be written back to a DRAM. A write-back routine may be called for any number of MRS commands. The method 700 may be performed by a computing system, such as the system 100 of FIG. 1. Turning more particularly to the flowchart, the system may receive at 702 a write-back command associated with one or more MRS commands. At 704, the system may process an MRS command of the one or more MRS commands. The system may determine at 706 whether PDA or PBA is enabled for the MRS command. If PDA or PBA is not enabled, the system may perform a write-back function at 708 using the MRS values of the MRS command.

Should the PDA or PBA be alternatively enabled at 706, the system may send at 710 a write-back MRS command to a memory device to enable PDA or PBA mode. A PDA or PBA write-back function may be performed at 712 using MRS values of the MRS command. At 714, the system may send another write-back MRS command to the memory device to disable PDA/PBA mode.

The system may determine at 716 if any MRS command called by the write-back routine are remaining to be processed. If so, the method 700 may return to processing at 704. Alternatively, the write-back operation may conclude.

Figure 8:
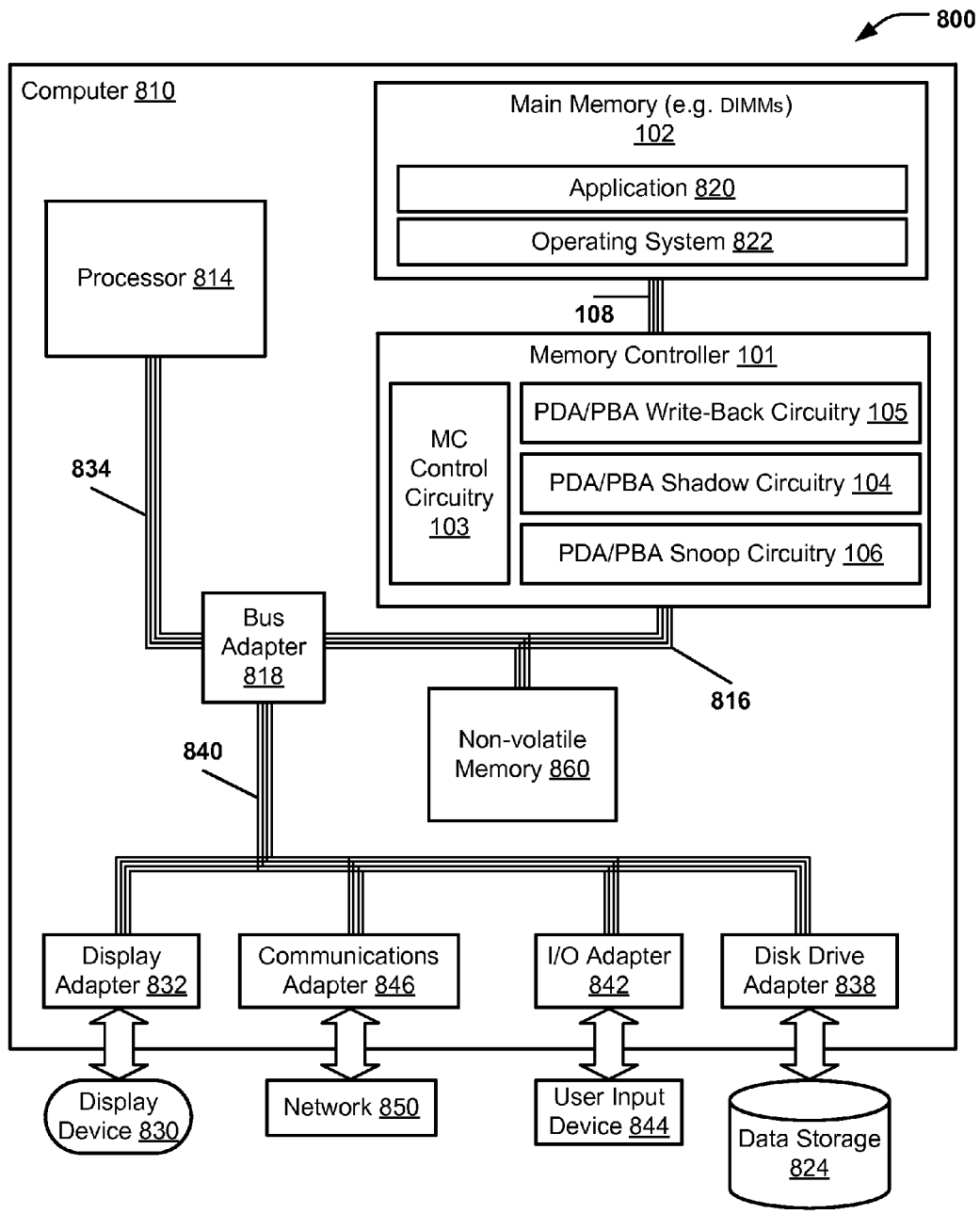
FIG. 8 is block diagram of general computing system configured to execute a hardware, firmware, or software embodiment to snoop for MRS commands issued for a PDA, PBA, and per-rank basis, to set a PDA or PBA status value.

Referring to FIG. 8, an illustrative system 800 including a computer 810 is shown. The computer 810 may be an implementation of the computing system 100 of FIG. 1. The computer 810 includes at least one computer processor (CPU) 814 as well as main memory 101, a memory controller 101, and a non-volatile memory 860. The main memory 102 is connected through a memory bus 808 to the memory controller 101. The memory controller 101 and the non-volatile memory 860 are connected through a memory bus 108 and a bus adapter 818 to the processor 814 through a processor bus 834.

Stored at the memory 102 is an application 820 that may be a module of user-level computer program instructions for carrying out particular tasks (e.g., the operations described with respect to the monitoring commands and setting values, etc.). Also stored at the main memory 102 is an operating system 822. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 822 and the application 820 in the example of FIG. 8 are shown in the main memory 102, but components of the aforementioned software may also, or in addition, be stored at non-volatile memory (e.g., on data storage, such as illustrative data storage 824 and/or the non-volatile memory 860).

The computer 810 includes a disk drive adapter 838 coupled through an expansion bus 840 and the bus adapter 818 to the processor 814 and other components of the computer 810. The disk drive adapter 838 connects non-volatile data storage to the computer 810 in the form of the data storage 824 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 824 may store the data and information described herein.

The computer 810 also includes one or more input/output ("I/O") adapters 842 that implement user-oriented input/output through, for example, software drivers and computer hardware for controlling input and output to and from user input devices 844, such as keyboards and mice. In addition, the computer 810 includes a communications adapter 846 for data communications with a data communications network 850. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 846 implements the hardware level of data communications through which one computer sends data communications to another computer, directly or through a data communications network. Examples of the communications adapter 846 suitable to use in the computer 810 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 810 also includes a display adapter 832 that facilitates data communication between the bus adapter 818 and a display device 830, enabling the application 820 to visually present output on the display device 830.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method comprising:
    monitoring a memory bus for one or more commands sent by a memory controller to a memory device;
    determining whether the one or more commands have a value indicating an operation mode of the memory device;

accessing information associated with the one or more commands based on the operation mode;

determining a signal integrity setting from the information;

in response to determining the signal integrity setting, storing the information and a status value indicative of the operation mode to one or more shadow registers; and writing-back the information stored in the shadow registers to the memory device.

2. The method of claim 1, wherein the one or more commands include one or more mode register set (MRS) commands or one or more buffer control-word write (BCW) commands.

3. The method of claim 1, wherein the monitoring the memory bus includes identifying an indicator associated with the one or more commands.

4. The method of claim 1, wherein the information includes dynamic random access memory (DRAM) configuration values.

5. The method of claim 4, wherein the DRAM configuration values includes one or more on-die termination (ODT) values, one or more voltage reference (Vref) values, or both.

6. The method of claim 1, wherein the memory device includes one or more DRAM devices of one or more ranks, one or more buffers, or both.

7. The method of claim 6, wherein the one or more DRAM devices and the one or more buffers are associated with a double data rate four (DDR4) memory device.

8. The method of claim 1, wherein the operation mode is a per dynamic random access memory (DRAM) addressability (PDA) mode, a per buffer addressability (PBA) mode, or a per rank mode.

9. The method of claim 8, wherein accessing the information includes:

a first set of configuration values in response to the value indicating the PDA mode or the PBA mode; and a second set of configuration values in response to the value indicating the per rank mode.

10. The method of claim 1, wherein storing the information includes:

writing a first information set associated with a first command to a first register of the one or more shadow registers; and while the first information set is stored at the first register, writing a second information set associated with a second command to a second register of the one or more shadow registers.

11. The method of claim 10, wherein the first register is associated with a first dynamic random access memory (DRAM) device of a plurality of DRAM devices of the memory device and the second register is associated with a second DRAM device of the plurality of DRAM devices of the memory device.

12. The method of claim 1, further comprising:

receiving a write-back command associated with the one or more commands.

13. The method of claim 1, wherein if the operation mode is a first mode or a second mode:

sending, to the memory device, an enable command to enable the first mode or the second mode of the memory device; and sending, to the memory device, a disable command to disable the first mode or the second mode of the memory device.

14. The method of claim 13, wherein the first mode is a per dynamic random access memory (DRAM) addressability (PDA) mode and the second mode is a per buffer addressability (PBA) mode.

15. An apparatus, comprising:

memory control circuitry;

shadow circuitry;

snoop circuitry configured to:

monitor a memory bus for one or more commands sent by the memory control circuitry to a memory device;

determine whether the one or more commands have a value indicating an operation mode of the memory device;

access information associated with the one or more commands based on the operation mode;

determine a signal integrity setting from the information;

in response to determining the signal integrity setting, store the information and a status value indicative of the operation mode to one or more registers of the shadow circuitry: and write-back circuitry configured to write-back the information stored within the one or more registers of the shadow circuitry to the memory device.

16. The apparatus of claim 15, wherein the operation mode is a per dynamic random access memory (DRAM) addressability (PDA) mode, a per buffer addressability (PBA) mode, or a per rank mode.

17. An apparatus, comprising:

a memory bus;

write-back circuity;

a shadow register; and a controller configured to monitor a memory bus for one or more commands sent to a memory device, to determine whether the one or more commands have a value indicating an operation mode of the memory device, to access information associated with the one or more commands based on the operation mode, to determine a signal integrity setting from the information, and in response to determining the signal integrity setting, to store the information and a status value indicative of the operation mode within the shadow register, and to use the write-back circuitry to write-back the information stored in the shadow register to the memory device.

18. The apparatus of claim 17, wherein the one or more commands include one or more mode register set (MRS) commands or more buffer control-word write (BCW) commands.

19. The apparatus of claim 17, wherein the controller is further configured to receive a write-back command associated with the one or more commands, and to determine whether the one or more registers have a second value indicating the operation mode associated with the one or more commands.

20. The method of claim 1, further comprising determining that the one or more commands include a mode register set (MRS) command or a buffer control-word write (BCW) command, wherein the one or more shadow registers are used based on the determination that the one or more commands include the MRS command or the BCW command.

* * * * *